C. W. COLEMAN.
TRACTION VEHICLE.
APPLICATION FILED APR. 5, 1907.
907,462.
Patented Dec. 22, 1908.
4 SHEETS—SHEET 3.
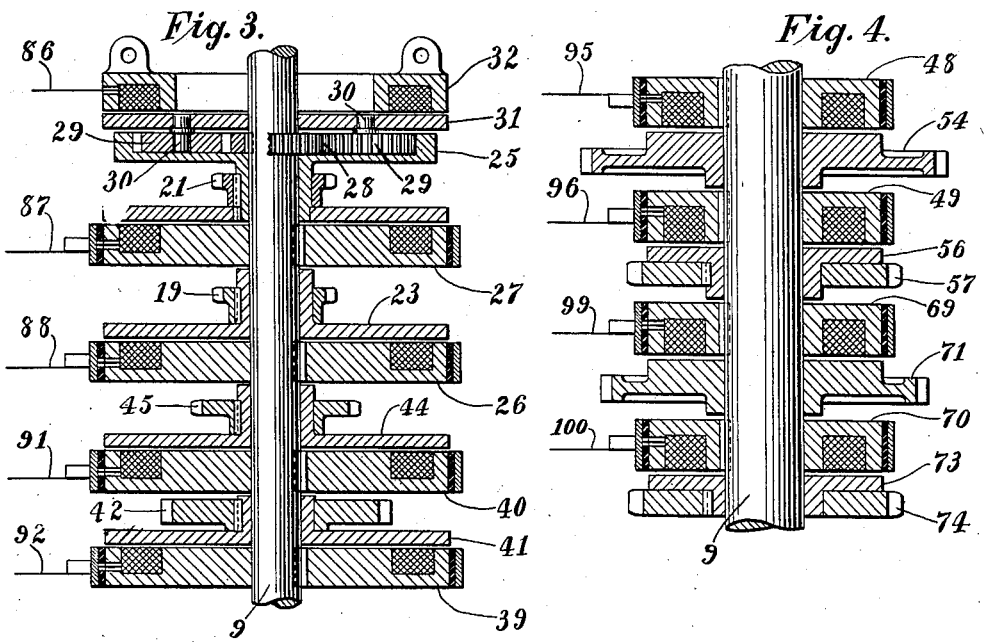
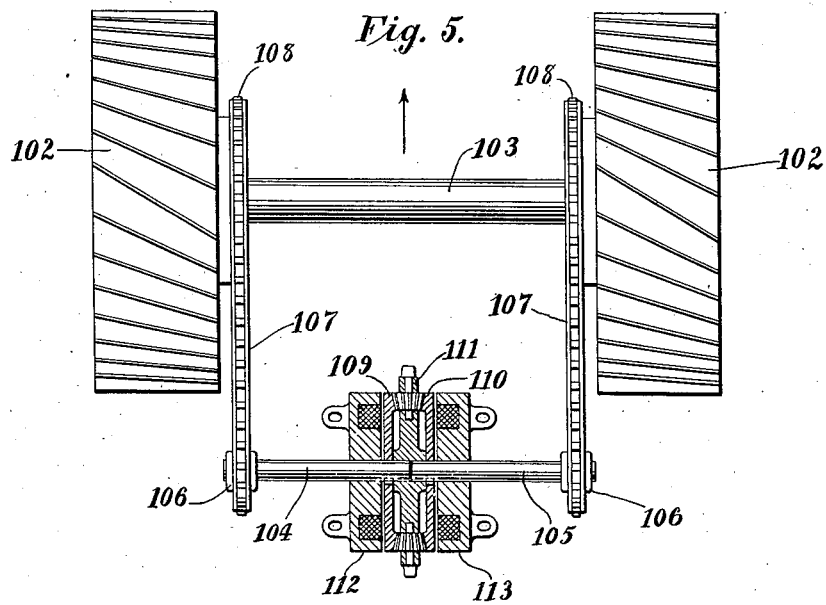
Witnesses:
Wm. Ashley Kelly
Bernard Cowen
Inventor:
Clarence W. Coleman
by Henry D. Williams
Atty.

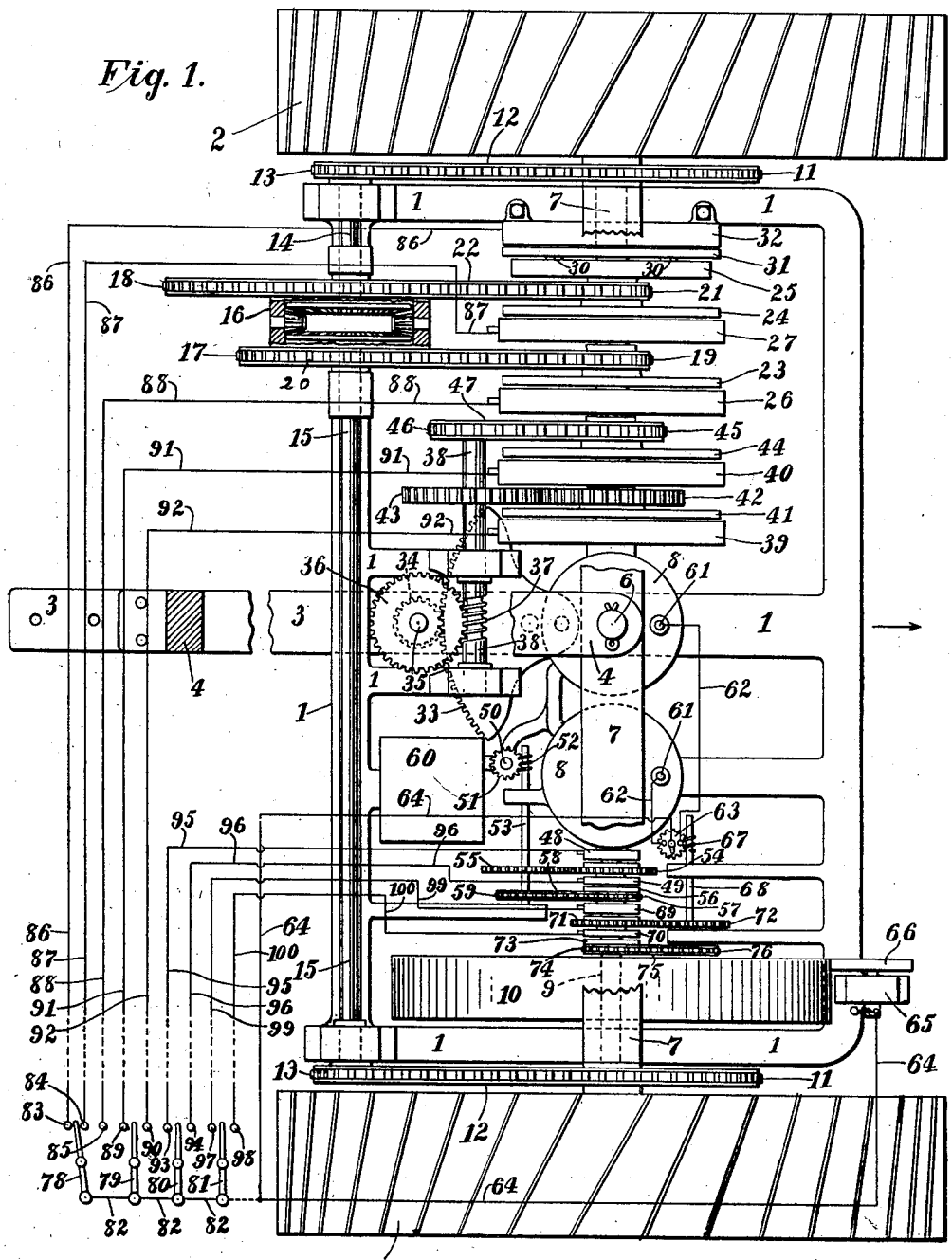

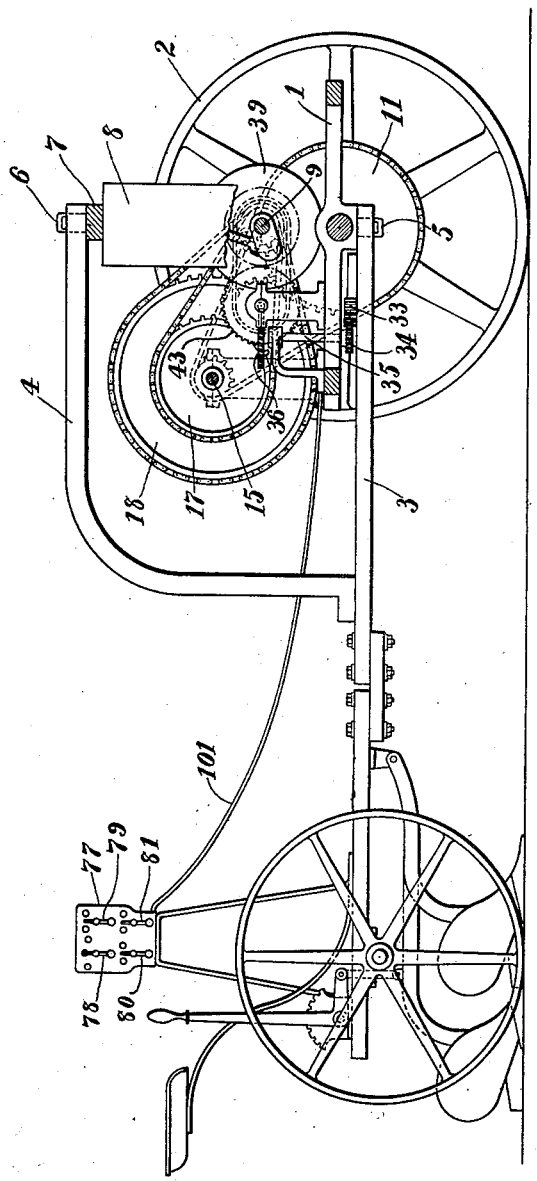

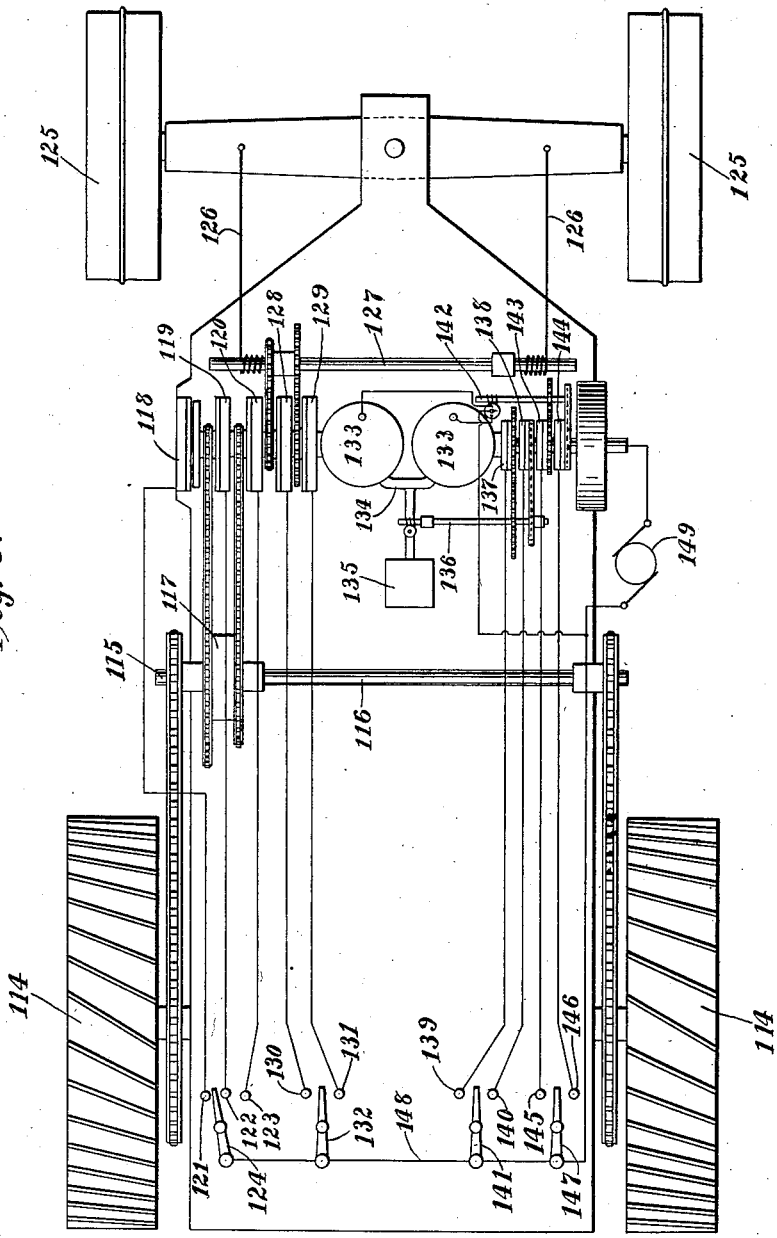

UNITED STATES PATENT OFFICE.

CLARENCE W. COLEMAN, OF WESTFIELD, NEW JERSEY.

TRACTION-VEHICLE.

No. 907,462.  Specification of Letters Patent.  Patented Dec. 22, 1908.

Application filed April 5, 1907. Serial No. 366,518.

*To all whom it may concern:*

Be it known that I, CLARENCE W. COLEMAN, a citizen of the United States, residing at Westfield, in the county of Union and State of New Jersey, have invented a certain new and useful Improvement in Traction-Vehicles, of which the following is a specification, reference being had therein to the accompanying drawings, forming a part thereof.

My invention relates to self-propelled vehicles such as are commonly known as traction engines and which are employed to communicate traveling movement to an independent vehicle or implement usually detachably coupled to the traction vehicle to be drawn thereby as a trailer.

The general objects of my invention are simplicity, convenience and economy.

A special object is the complete control of the traction vehicle and of its propelling engine at a distance therefrom, as, for example, from a drawn vehicle or trailer, thus enabling one man to control the operation of both vehicles, whereas the ordinary traction engine requires one man to operate the engine and another to operate the implement that is being pulled.

Another object is to secure a short wheel base, when the propelling vehicle or traction vehicle is coupled to a propelled vehicle or implement, with subsequent ability to turn within a small space, thus facilitating work in small fields and other limited spaces.

A further object is to obtain a traction vehicle adapted to be built at small cost in comparatively small sizes, such for example as are capable of doing the work of three or four horses.

My invention includes means for electrically controlling the propulsion and steering of a traction vehicle from a point removed from such vehicle. This permits a man who may be riding on a drawn implement to attend not only to the operation of such implement but also to guide, stop, start, change the rate of travel of and reverse the direction of travel of the traction vehicle at will and without leaving his seat on the drawn implement, thus dispensing with the services of an additional man to ride on and attend to the traction vehicle. It also permits the traction vehicle to be controlled from any desired location and at any desired distance.

My invention also includes means for electrically controlling from a distance the throttle mechanism and the ignition devices of an internal combustion engine or hydrocarbon engine carried by and forming a part of a traction vehicle for propelling the vehicle. This gives to the man on the drawn implement or vehicle the same convenient control of the operation of the engine itself that he has of the travel of the traction vehicle. By actuating movable contacts within his easy reach he may adjust the engine throttle and advance or retard the spark as well as is usually done by an attendant at the side of the engine.

My invention also includes the provision of electro-magnetic clutches for transmitting tractive effort from an engine to the traction wheels.

My invention further includes electromagnetic clutches for taking power from the internal combustion engine to actuate both the throttle-actuating mechanism and the spark distributer. This gives in an efficient manner the complete distant electrical control above mentioned, both as to the travel of the traction vehicle and as to the control of the operation of the propelling engine thereof. The electrical energy both for ignition purposes and for energizing the electrical clutches is conveniently supplied by a generator, such as a magneto, driven by the engine itself.

My invention also includes various improvements in the construction and combination of parts, and has other objects and advantageous features, as will appear from the following description.

Figure 1 is a plan view of a two-wheeled traction vehicle embodying my invention, with parts broken out and with the electrical circuits shown diagrammatically. Fig. 2 is a sectional elevation of my improved traction vehicle and shows the same as coupled to an implement for drawing such implement and as adapted for control from such implement. Fig. 3 is an enlarged central sectional plan of the electro-magnetic clutches, sprockets and gears shown in Figs 1 and 6 for propelling and guiding the traction vehicle. Fig. 4 is a greatly enlarged central sectional plan of the electro-magnetic clutches, sprockets and gears shown in Figs. 1 and 6 for controlling the operation of the engine. Fig. 5 is a diagrammatic plan view showing in central section a modified steering mechanism. Fig. 6 is a partly diagrammatic plan view of a four-wheeled traction vehicle embodying my invention.

In the embodiment of my invention shown in Figs. 1 to 4 of the drawings an engine-carrying frame 1 is supported by a pair of traction wheels 2, one at each side of the frame. As in this form of my invention no other supporting means are provided save these two traction wheels, the traction vehicle cannot keep its equilibrium alone but depends for this purpose upon its attachment to some other vehicle, as shown in Fig. 2. For attaching the traction vehicle to another vehicle for propelling or drawing the latter the traction vehicle is provided with a coupling pole or reach 3. The reach 3 is provided with an upper branch or brace 4, the inner ends of the reach and its brace being pivoted to the engine-carrying frame or vehicle frame in the same vertical plane as the axes of the traction wheels and in vertical alinement with each other, the reach passing beneath the vehicle frame and being pivoted thereto by a pivot pin or lower king bolt 5, and the brace passing above the frame and having its pivotal connection by a pivot pin or upper king bolt 6 to an upper bar or crosspiece 7 of the frame. The reach 3 at its rearward end is provided with apertures as shown for the purpose of making connection to a trailer or drawn vehicle of any description. In Fig. 2 the traction vehicle or traction engine is shown as connected to a two-wheeled plow for drawing the same. However, it is to be understood that the traction engine may be connected instead and with equal facility to any kind of implement or vehicle, such, for example, as a reaper or a truck, and such drawn implement or vehicle may have any number of supporting wheels, such as one, two, three, four or more. When the traction engine is connected to a trailer the reach 3 performs substantially the function of the usual tongue or pole used for attachment of horses, and, in fact, may, as shown in Fig. 2, form virtually a continuation of a stub tongue belonging to the trailer.

For supplying propulsive power the vehicle frame 1 carries or supports an internal combustion engine having cylinders 8 and having a main shaft 9 extending from each side of the engine and having bearings in the frame 1. The main shaft or power shaft 9 is provided with a usual fly-wheel 10 which may also be used as a belt pulley for taking off power from the engine for other purposes than locomotion or traction purposes and when the traction vehicle is standing or stationary.

The traction wheels are loosely mounted so as to be capable of rotation independently of each other. Connected to each traction wheel for driving the same are respective sprocket wheels 11 driven by respective chains 12 which in turn are driven by sprocket pinions 13 carried respectively by axially alined counter shafts 14 and 15 supported in bearings on the frame 1 as shown. The adjacent ends of the shafts 14 and 15 are operatively connected together by an ordinary compensating gear or equalizing "differential" gear, shown as of the well known bevel type. For propelling the traction vehicle at different selected speeds, the rim 16 of the equalizing gear, and which carries inwardly the equalizing pinions, as shown, carries outwardly a plurality of drive sprockets of different diameters. Such rim 16 is shown as provided with two such drive sprockets 17 and 18, thus giving two speeds for the traction wheels, the smaller sprocket 17 giving a higher speed and the larger sprocket 18 giving a lower speed, these two sprockets being shown as adapted to be driven at the same peripheral speed by the engine.

Means are provided for applying power to or driving either the one or the other of these drive sprockets according to which traction speed is desired; also means are provided for reversing the direction of rotation of the larger or low speed sprocket for reversing the direction of travel or backing the traction vehicle when desired. Power is applied to the smaller or high speed drive sprocket 17, from a sprocket pinion 19 carried by the engine shaft 9, by a driving chain 20; and power is applied to the low speed and reversing drive sprocket 18, from another similar sprocket pinion 21 carried by the engine shaft, by a driving chain 22. The power-supplying pinions 19 and 21 are not fixed upon the engine shaft 9 but are actuatable therefrom through the intermediary of magnetic clutches, each of such pinions being carried by or mounted to rotate with one of the clutch members of such clutch. The driving pinion 19 is shown as keyed fast on the hub or sleeve of a clutch armature 23 loosely rotatably and slidably mounted on the engine shaft 9. The driving pinion 21 and a clutch armature 24 are shown as both together keyed fast on the hub or sleeve of an internally toothed gear wheel 25 which forms one member of a reversing gear and is loosely rotatably and slidably mounted on the engine shaft 9. Thus the pinion 21, clutch armature 24 and gear wheel 25 are virtually integral in that they move together as a unit.

The engine shaft 9 of course rotates always in the same direction, that being the direction in which the traction wheels rotate when the vehicle is moving forward. The clutch armature 23 is caused to rotate with the engine shaft, to propel the vehicle forward, by a magnetic clutch 26 having a coil or winding as shown and shown as fixed on the engine shaft by a key. When the coil of the clutch 26 is energized such clutch attracts and holds its armature 23, causing the armature 23 and drive pinion 19 to rotate with the clutch element 26 to propel the vehicle in a forward direction at the high speed, as will be readily understood from the foregoing.

To propel the vehicle in a forward direction at low speed the clutch armature 24 is caused to rotate with the engine shaft by a magnetic clutch element 27 shown as keyed fast upon the engine shaft and provided with a winding as shown, such armature and sprocket pinion 21 being caused to rotate with the engine shaft when the winding of the clutch element 27 is energized.

To propel the vehicle in a backward direction a reversing gear is provided comprising the internally toothed gear wheel 25, on the hub or boss of which is keyed the drive sprocket pinion 21, a spur pinion 28 shown as keyed on the engine shaft 9, and reversing pinions 29 meshing with the pinion 28 and the internal gear wheel 25. The reversing pinions 29 are mounted on studs or stub shafts 30 carried by a clutch armature 31 which is loosely slidably and rotatably mounted on the engine shaft 9. When the sprocket pinion 21 is driven by the clutch armature 24, then the gear wheel 25, pinions 28 and 31, and clutch armature 31 all rotate together as a unit idly and perform no function. To produce a reverse rotation of the pinion 21, to back the vehicle, the clutch armature 31 is attracted and held stationary by a stationary magnetic clutch member 32 provided with an energizing coil as shown, the clutch member 27 being left unenergized. When the reversing armature clutch 31 is held stationary it is seen that the gear wheel 25 and sprocket pinion 21 will be driven in the reverse direction by spur pinion 28 and reversing pinions 29. Owing to the internal gear wheel 25 being of greater diameter than the spur pinion 28 the sprocket pinion 21 will be driven in the reverse direction at a reduced rate from that communicated to it in the forward direction by the clutch members 24 and 27, the result being that the vehicle will back at a slower speed than the slow speed ahead, and which is altogether desirable for obvious reasons. The magnetic clutch member 32 is shown as retained in stationary position by lugs secured by bolts to the vehicle frame 1 as shown.

For steering purposes the reach 3 is shown as provided with a segmental gear or rack 33 shown as fixedly secured to the reach by bolts. A steering pinion 34 engages with this rack, such pinion being carried by a vertical steering shaft 35 having bearings in the vehicle frame. The steering shaft 35 is actuatable by a worm gear comprising a worm wheel 36, carried by the shaft 35 at a point above the pinion 34, and engaged by a screw 37 shown as formed on a short horizontal steering-gear-actuating shaft 38 supported in bearings carried by the frame 1 as shown. It is evident that if the shaft 38 be actuated or rotated in one direction that the angular relation of the frame 1 and reach 3 will be relatively altered to steer or guide the vehicle in one direction and that if such shaft be rotated in the opposite direction that the vehicle will be guided in an opposite direction. Means are provided for rotating the shaft 38 in the one direction or the other at will and for leaving it remain in any desired position. Such means comprise magnetic clutch elements 39 and 40 shown as fixed by keys on the engine shaft 9 and having magnetizing coils or windings as shown. Either the clutch element 39 or 40 is energized or magnetized at will according to the direction in which it is desired to steer the vehicle; and if neither of such clutch elements be energized then the steering gear, by reason of the worm gear which forms a part thereof, will remain fixed in whatever position to which it has been adjusted or set. When the clutch element 39 is energized it attracts a clutch armature 41 which is loosely slidably and rotatably mounted on the engine shaft to cause such armature to rotate. Rotary motion of the armature 41 is communicated to the steering-gear-actuating shaft 38 by spur gears 42 and 43, the former being keyed on the hub or boss of the clutch armature 41 as shown and the latter being carried by the shaft 38. By tracing the mechanical connections it will be seen when the clutch element 39 is energized that the vehicle will be steered toward the right when going ahead. For steering the vehicle in the opposite direction or toward the left the clutch element 40 is energized to attract a clutch armature 44 which is loosely slidably and rotatably mounted on the engine shaft. The clutch armature 44 rotates the steering-gear-actuating shaft 38 through the intermediary of sprockets 45 and 46 and connecting chain 47, the sprocket 45 being keyed as shown to the hub of the clutch armature 44 and the sprocket 46 being carried by the shaft 38. It is evident that the steering-gear-actuating shaft 38 will be rotated in an opposite direction by the sprockets 45 and 46 and chain 47 to what it was rotated by the spur gears 42 and 43 and that therefore steering of the vehicle will be had in the opposite direction or towards the left when the vehicle is going ahead.

By reason of the mechanisms embodying the electromagnetic clutches above described convenient control of the vehicle as to moving backward, traveling forward at a selected speed and steering may be electrically accomplished from a point distant from the traction vehicle, as, for example, from a drawn vehicle or trailer as shown in Fig. 2. Means are also provided for electrically controlling the operation of the internal combustion engine itself from the same distant location. As illustrated in the drawings certain parts of the engine and its adjuncts are omitted because well known and forming no part of the present invention. For the throttle control of the engine such means comprise magnetic clutch elements 48 and 49 shown as keyed on the engine shaft and provided with windings as shown. A usual throttle-controlling stem or shaft is shown as actuatable by worm gearing comprising a worm wheel 51 carried by the throttle stem 50 and actuatable by a screw 52 formed on a throttle-actuating shaft 53 mounted in bearings on the engine frame 1 as shown. It is apparent that the usual throttle control may be had by rotating the throttle-actuating shaft 53 in one direction or in the other. Such rotation of the shaft 53 may be effected at will by the energization of the one or the other of the throttle-controlling clutch elements 48 or 49. When the clutch element 48 is energized it attracts a small spur gear 54 which forms also an armature therefor and which is loosely slidably and rotatably mounted on the engine shaft, causing such gear to rotate with the engine shaft. The gear 54 engages with a similar gear 55 carried by the throttle-actuating shaft 53 to rotate the shaft 53 in one direction of its movement. When the clutch element 49 is energized it attracts a clutch armature 56 which is loosely slidably and rotatably mounted on the engine shaft and upon the hub of which is shown as keyed and virtually forming a unit therewith a small sprocket pinion 57. The sprocket pinion 57 communicates its rotation to the throttle-actuating shaft 53 by a chain 58 and another similar sprocket pinion 59 carried by the shaft 53, the shaft 53 now, as is apparent, rotating in the opposite direction to what it would be rotated by the spur gears 54 and 55 and affecting the throttle accordingly. The fuel for the engine is carried in a usual fuel tank 60, the carbureted fuel being supplied to the cylinders through usual manifold piping as shown.

The engine is provided with usual ignition devices comprising spark plugs 61. The spark circuit is shown diagrammatically and includes conductors 62 leading from respective distributer contact terminals, carried by a usual adjusting-frame or shiftable contact-terminal-carrier 63, to the respective spark plugs. A common or single conductor 64 leads from one pole of a source of electric current, shown as a generator 65, to the usual rotary contact terminal of the distributer, the other pole of the electrical source being grounded to the frame 1 as shown thus completing the circuit for the spark plugs in the usual manner. The generator 65 is shown as operated by a friction pulley 66 making mechanical contact with the engine fly wheel 10. The shiftable contact-terminal-carrier or distributer 63 is shown as provided with worm teeth which are engaged by screw threads 67 formed on a spark-adjusting shaft 68 supported in bearings on the engine frame as shown. It is evident that the spark will be advanced or retarded according as the spark-adjusting shaft 68 is rotated in one direction or the other. The means for thus rotating the shaft 68 at will comprise magnetic clutch elements 69 and 70 shown as keyed fast to the engine shaft and provided with magnetizing windings. When the clutch element 69 is energized it attracts and causes to rotate therewith a small spur gear 71 which forms also a clutch armature and is loosely slidably and rotatably mounted on the engine shaft. The spur gear 71 meshes with a similar spur gear 72 carried by the spark-adjusting shaft 68 to rotate such shaft in one direction of its movement and to adjust the spark accordingly by shifting the contact-terminal-carrier or distributer 63. When the clutch element 70 is energized it attracts and causes to rotate therewith a clutch armature 73 which is loosely slidably and rotatably mounted on the engine shaft and upon the hub of which is shown as keyed and virtually forming a unit therewith a small sprocket 74. The sprocket 74 communicates rotation to the spark-adjusting shaft 68 by a chain 75 and another small sprocket 76 carried by the shaft 68. It is apparent that the spark-adjusting shaft 68 will be rotated in the opposite direction by sprockets 74 and 76 and chain 75 to what it would be rotated by the spur gears 54 and 55 and that hence the spark will be correspondingly oppositely adjusted.

The circuits for the electro-magnetic clutches are shown diagrammatically in Fig. 1, it being understood that the circuits are completed to ground through the engine frame. One terminal of the energizing coil for each clutch is continued in the form of a conductor. In the case of the rotatable electro-magnetic clutch members such terminals are respectively connected to usual contact rings carried by and insulated from the corresponding clutch members as shown (see Figs. 3 and 4). A brush is provided, as shown in diagram, for each contact ring, each brush having a conductor connected thereto. All of the conductors lead to a common location to enable control of all clutches from that point and consequently the complete control of both the vehicle and the engine from such point. For effecting such control a switch board or controller 77 is provided which may be located at any point desired, and probably would usually be mounted upon the trailer or drawn vehicle as shown in Fig. 2, thus enabling one person to control both vehicles. The controller is shown as provided with four movable contact-terminals or switch arms 78, 79, 80 and 81 (Figs. 1 and 2), provided with handles as shown, for manual actuation. These switch arms are shown as all connected by a conductor 82 with the conductor 64 leading from the generator 65.

The switch arm 78 controls the locomotion or travel of the traction vehicle. It is arranged to make contact with none or with any one of three stationary contact terminals 83, 84 and 85. The stationary contact terminal 83 is connected by a conductor 86 with the magnetizing winding of the stationary backing clutch 32; the stationary contact terminal 84 is connected by a conductor 87 with the brush of the slow-speed-ahead clutch 27; and the stationary contact terminal 85 is connected by a conductor 88 with the brush of the high-speed-ahead clutch 26. If the movable terminal or switch arm 78 be placed on the stationary terminal 83, and the engine operated, the vehicle will be driven backwards; if the switch arm 78 be placed on the stationary terminal 84, as shown in Fig. 2, the vehicle will be driven forward at the slow speed; if the switch arm 78 be placed on the stationary terminal 85 the vehicle will be driven forward at the high speed; and if such switch arm be placed at a point intermediate of the stationary terminals, as shown in Fig. 1, the vehicle will not be driven although the engine may be running.

The switch arm 79 has control of the steering or guiding of the vehicle. It is arranged to make contact with either or neither of stationary contact terminals 89 and 90 from which conductors 91 and 92 lead respectively to the brushes of the leftward and rightward steering clutches 40 and 39. When the switch arm 79 is placed on the terminal 89 the steering mechanism will be operated to turn the vehicle toward the left, when going ahead; when the switch arm 79 is placed on the terminal 90 the steering mechanism will be operated to turn the vehicle toward the right; and when such switch arm is placed intermediate of the terminals 89 and 90, as shown in Figs. 1 and 2, the vehicle will proceed in a set course determined by the correspondingly fixed or set adjustment of the steering mechanism.

The switch arm 80 is in control of the throttle regulation of the engine. It is arranged to make contact with either or neither of stationary contact terminals 93 and 94 from which conductors 95 and 96 lead respectively to the brushes of the throttle-controlling clutches 48 and 49. The throttle stem 50 will be rotated in one direction or the other according as the switch arm 80 is in contact with the terminal 93 or 94. When such switch arm is at a point intermediate of the terminals 93 and 94, as shown in Figs. 1 and 2, the throttle will remain in whatever position of adjustment it has been placed.

The switch arm 81 controls the sparking devices or ignition devices of the engine. It is arranged to make contact with either or neither of stationary contact terminals 97 and 98 from which conductors 99 and 100 lead respectively to the brushes of the spark-controlling clutches 69 and 70. The distributer 63 will be shifted to advance or retard the spark according as the switch arm 81 is in contact with the terminal 97 or 98. When such switch arm is at a position intermediate of the terminals 97 and 98, as shown in Figs. 1 and 2, the distributer will remain in whatever position of adjustment it has been placed.

The conductors 82, 86, 87, 88, 91, 92, 99 and 100, shown diagrammatically in Fig. 1, are conveniently grouped or incorporated in a cable 101, as shown in Fig. 2. The dotted portions of these conductors in Fig. 1 indicate that such conductors may proceed to some more or less distant point. The controller 77 in which these conductors terminate is shown in Fig. 2 as within easy reach of a rider on the drawn implement, thus permitting one person to control both the drawn implement and the traction vehicle. From his seat on the drawn implement he may manipulate such drawn implement and control the operation thereof in usual manner, while also he may stop, start, back, drive ahead and change the speed of the traction vehicle and also has control of the engine itself by causing the actuation of the usual throttling and spark-controlling devices. In the preferred form of my invention the two-wheeled traction vehicle when coupled to a trailer gives a much shorter wheel base than is the case with the usual four-wheeled traction engine, thus permitting turning in much less space and enabling more advantageous use in small fields.

In the modification of my invention illustrated in Fig. 5 a diagrammatic representation of a portion of a traction vehicle is shown having a modified steering mechanism but which may in other respects be of the same construction as illustrated in the preceding figures and described above. Traction wheels 102 are loosely mounted on an axle 103 so as to be capable of rotation independently of each other and are arranged to be respectively driven from axially alined shafts 104 and 105 carrying respectively sprocket pinions 106 which communicate their rotation to the traction wheels by chains 107 and sprocket wheels 108 operatively connected to the respective traction wheels. The construction as so far described is substantially the same as hereinbefore described in reference to Figs. 1 to 4. Also the adjacent ends of alined counter shafts 104 and 105 are operatively connected together so as to be driven by a compensating gear or equalizing gear in substantially the same manner as in the hereinbefore described construction, but in the present construction the equalizing gear performs the additional function of assisting in the steering of the vehicle. The equalizing gear is of the usual bevel type, bevel gears 109 and 110 being shown as keyed respectively on the shafts 104 and 105. Usual bevel equalizing pinions are carried by a pinion-carrying sprocket wheel 111 shown as mounted to rotate freely on the adjoining ends of the shafts 104 and 105. Power for propelling the vehicle may be applied to the sprocket 11 in the same manner as it was applied to the sprockets 17 and 18 in the construction first described. The fact that there is only one sprocket 111 to correspond to the two sprockets 17 and 18 is only incidental and corresponds to one speed of propulsion instead of two.

For guiding or steering the traction vehicle stationary electro-magnetic clutch elements 112 and 113 are provided and which may be energized in a similar manner to that already described. Such clutch elements are shown as provided with attaching or securing lugs having slotted holes, to prevent rotation of the clutch members while permitting a limited sliding movement relatively to the length of the shafts 104 and 105. The bevel gear wheels 109 and 110 of the compensating gear are adapted to act also as clutch armatures for the clutch members 112 and 113 respectively. The traction vehicle will be steered to the right or to the left by energizing the one or the other of the magnetic clutch members. When one of such clutch members is energized it attracts and holds or retards the rotation of the adjacent bevel wheel which constitutes its armature, thus retarding the rotation of the corresponding traction wheel while a correspondingly increased rotation is communicated to the other traction wheel. For example, to steer to the right, when the vehicle is going forward, as indicated by the arrow, the clutch element 113 would be energized. When both magnetic clutch members are deënergized the compensating gear operates in the usual manner of such gears.

In Fig. 6 a diagrammatic representation is shown of an embodiment of my invention in a four-wheeled traction vehicle. Such vehicle is provided with usual rear traction wheels 114. These traction wheels are driven and their operation controlled in substantially the same manner as in the two-wheeled construction illustrated in Figs. 1 to 4. For example, counter shafts 115 and 116, carrying equalizing gear 117, correspond with counter shafts 14 and 15, carrying the equalizing gear 16; electro-magnetic clutches 118, 119 and 120 correspond with the clutches 32, 27 and 26; and stationary contact terminals 121, 122 and 123 and controlling lever or switch arm 124 correspond respectively with terminals 83, 84 and 85 and switch arm 78.

In the present construction the front wheels 125 are guided in the usual manner by cables 126 reversely wound on a steering-shaft 127. Shaft 127 corresponds in function with the screw-carrying steering-gear-actuating shaft 38 and has a similar operative connection with the engine shaft. Magnetic steering-clutches 128 and 129 correspond with the similar clutches 40 and 39; and stationary contact terminals 130 and 131 and steering-gear-controlling switch arm 132 corresponds with the switch arm 79 of similar function.

As in the first described construction, propulsive and guiding power is supplied by a hydrocarbon or internal combustion engine the cylinders 133 of which in usual manner receive carbureted fuel through manifold 134, such fuel being contained in a tank 135. Throttle-actuating shaft 136 corresponds with the similar shaft 53 and is operatively connected with the engine shaft in a similar manner. Throttle-controlling magnetic clutch elements 137 and 138 are substantially the same as clutch elements 48 and 49; and stationary contact terminals 139 and 140 and throttle-regulating switch arm 141 are substantially the same as similar parts 93, 94 and 80 respectively. Spark-adjusting shaft 142 corresponds with the similar shaft 68 and is similarly operatively connected with the engine shaft. Spark-controlling clutches 143 and 144 correspond with similar clutches 69 and 70; and contact terminals 145 and 146 and ignition-device-controlling switch arm 147 are substantially the same as similar parts 97, 98 and 81 respectively. All the switch arms are connected in common to a conductor 148 corresponding to the conductor 82. Current for ignition and for energizing the clutches is supplied by a generator 149 which may be operated similarly to the generator 65. In this modification the controlling switches are shown as all mounted on or carried by the traction vehicle itself, but it is obvious that they could as well be located on some other vehicle, as in Fig. 2 of the first described construction. It is likewise obvious, in any of the constructions herein described, that such controlling switches could be located at any more or less distant point desired, for control of the traction vehicle and its engine from that point. It is further obvious that various modifications may be made in the constructions shown and above particularly described within the principle and scope of my invention.

I claim:

1. In a traction vehicle, the combination of an engine for propelling the vehicle, steering wheels, mechanism for moving the steering wheels to steer the vehicle, and electrically controlled mechanical connections between the steering mechanism and the engine whereby the steering mechanism may be mechanically actuated under electric control.

2. In a traction vehicle, the combination of traction wheels, an engine for actuating the traction wheels provided with a throttle valve, and electrically controlled mechanism connected with the throttle valve and mechanically actuated by the engine for moving the throttle valve to control the operation of the engine.

3. In a traction vehicle, the combination of traction wheels, an engine for actuating the traction wheels provided with igniting devices, and electrically controlled mechanism connected with the igniting devices and mechanically actuated by the engine for adjusting the igniting devices to control the operation of the engine.

4. In a traction vehicle, the combination of traction wheels, an internal combustion engine for actuating the traction wheels, a speed-controlling device for the engine mechanically actuated by the engine, and means for electrically controlling the speed-controlling device.

5. The combination of a traction vehicle provided with power mechanism and steering mechanism, a vehicle removably connected with and drawn by the traction vehicle, and means for electrically controlling the power mechanism and the steering mechanism from the drawn vehicle.

6. In a traction vehicle, the combination of power mechanism for propelling the vehicle, steering wheels, steering mechanism for moving the steering wheels arranged to be actuated by said power mechanism, and means for electrically controlling the power mechanism and the steering mechanism.

7. In a traction vehicle the combination of traction wheels, an internal combustion engine for actuating the traction wheels, speed-controlling devices for the engine arranged to be actuated by the power of the engine, a vehicle removably connected with and drawn by the traction vehicle, and means for electrically controlling said engine-controlling devices from the drawn vehicle.

8. The combination of a traction vehicle provided with a prime motor for propelling it, a drawn vehicle removably connected with the traction vehicle, and flexible connections between the prime motor and the drawn vehicle to permit the control of the motor from the drawn vehicle.

9. The combination of a traction vehicle provided with a prime motor for propelling it, a drawn vehicle removably connected with the traction vehicle, and flexible electric connections between the prime motor and the drawn vehicle to permit the control of the motor from the drawn vehicle.

10. The combination of a two-wheeled traction vehicle provided with a prime motor, transmission mechanism for connecting the motor with the wheels, steering mechanism for turning the wheels to steer the vehicle, a drawn vehicle removably connected with the traction vehicle, magnetic devices for controlling the transmission mechanism to connect and disconnect the motor and the wheels, and electrical connections between the drawn vehicle and said magnetic means and between the drawn vehicle and the steering mechanism to permit control of the traction vehicle from the drawn vehicle.

11. The combination of a traction vehicle provided with a prime motor, traction wheels, electrically controlled means for connecting the motor with the wheels to propel the vehicle, steering mechanism, and electrically controlled means for connecting the motor with the steering mechanism to actuate the latter, a drawn vehicle, and electric connections between said electrically controlled means and the drawn vehicle to permit the control of the traction vehicle from the drawn vehicle.

12. The combination of a two-wheeled traction vehicle provided with a prime motor, magnetically operated connections between the motor and the wheels to propel the vehicle, steering mechanism, electrically controlled mechanical connections between the motor and said mechanism to actuate the latter, a drawn vehicle connected with and maintaining the equilibrium of the traction vehicle, and electric connections between said magnetically-operating connections and said electrically - controlled mechanical connections and the drawn vehicle to permit the control of the traction vehicle from the drawn vehicle.

In testimony whereof I have affixed my signature in presence of two witnesses.

CLARENCE W. COLEMAN.

Witnesses:
WM. ASHLEY KELLY,
BERNARD COWEN.